United States Patent [19]

Hammond

[11] Patent Number: 4,787,057

[45] Date of Patent: Nov. 22, 1988

[54] FINITE ELEMENT ANALYSIS METHOD USING MULTIPROCESSOR FOR MATRIX MANIPULATIONS WITH SPECIAL HANDLING OF DIAGONAL ELEMENTS

[75] Inventor: Steven W. Hammond, Schenectady, N.Y.

[73] Assignee: General Electric Company, Schenectady, N.Y.

[21] Appl. No.: 870,566

[22] Filed: Jun. 4, 1986

[51] Int. Cl.$^4$ ............................................. G06F 7/52
[52] U.S. Cl. ................................................ 364/754
[58] Field of Search .............. 364/754, 757, 726, 728, 364/200

[56] References Cited

U.S. PATENT DOCUMENTS

| | | | |
|---|---|---|---|
| 4,493,048 | 1/1985 | Kung et al. | 364/754 |
| 4,533,993 | 8/1985 | McCanny et al. | 364/200 |
| 4,639,857 | 1/1987 | McCanny et al. | 364/200 |
| 4,667,300 | 5/1987 | Guilfoyle | 364/713 |
| 4,686,645 | 8/1987 | McCanny et al. | 364/754 |
| 4,698,751 | 10/1987 | Parvin | 364/754 |
| 4,701,876 | 10/1987 | McCanny et al. | 364/728 |
| 4,727,503 | 2/1988 | McWhirter | 364/715 |

FOREIGN PATENT DOCUMENTS 2168509 6/1986 United Kingdom ................ 364/754

OTHER PUBLICATIONS

"The Finite Element Method for Engineers" by Huebner et al., John Wiley and Sons, 1982, Chapters 1-3.
"Introduction to Numerical Computations" by Vandergraft, Academic Press, Second Edition, Chapter 6.
"Elementary Numerical Analysis" by Conte et al., McGraw-Hill, 1972, Section 3.2.
"Computational Models for Future Signal Processing Supercomputers" by Kung, Dept. of Computer Science, Carnegie Mellon University, Pittsburgh, PA 8/4/86.
"Wafer-Scale Integration and Two-Level Pipelined Implementations of Systolic Arrays" by Kung et al., Journal of Parallel and Distributed Computing, No. 1, 1984, pp. 32-63.
"A Systolic Array Computer" by Arnould et al., IEEE Int'l Conference on Acoustics, Speech, and Signal Processing, Mar. 26-29, 1985.
"Inner Product Computers" by Swartzlander, Jr. et al., IEEE Trans. on Computers, vol. C-27, No. 1, Jan. 1978, pp. 21-31.
"Systolic Arrays [for VLSI]" by Kung et al., Sparce Matrix Proceedings 1978, Society for Industrial and Applied Math., pp. 256-282.
"An Efficient Parallel Algorithm for the Solution of Large Sparse Linear Matrix Equations" Arnold et al., IEEE Trans. on Computers, vol. C-32, No. 3, Mar. 1983, pp. 265-272.

Primary Examiner—Gary V. Harkcom
Assistant Examiner—Tan V. Mai
Attorney, Agent, or Firm—Paul R. Webb, II; James C. Davis, Jr.

[57] ABSTRACT

Loading and storing a matrix associated with equations defining a physical system into the memory of a multiprocessor is accomplished by scanning along one orthogonal axis of the matrix and loading non-zero elements into memory associated with a plurality of the processors to form a transpose vector, with diagonal elements of the matrix being stored in the memory of a selected one of the processors. Each stored matrix element is provided with an index which identifies the origin of the element along the other axis of the matrix.

32 Claims, 3 Drawing Sheets

FINITE ELEMENT ANALYSIS METHOD USING MULTIPROCESSOR FOR MATRIX MANIPULATIONS WITH SPECIAL HANDLING OF DIAGONAL ELEMENTS

RELATED U.S. PATENT APPLICATIONS

This application is related to commonly assigned U.S. patent application Ser. No. 870,467, filed on even date in the name of Steven W. Hammond, entitled "Finite Element Analysis Apparatus and Method Using a Multiprocessor for Matrix Manipulations".

BACKGROUND OF THE INVENTION

This invention is directed generally to techniques for analyzing physical phenomenon, including products or physical systems which are definable in terms of systems of linear equations. Specifically, the invention relates to operating a multiprocessor in a manner to efficiently analyze manufactured products or physical systems represented by such systems of equations. One such technique involves a machine implemented method for loading and storing a matrix which characterizes, in part, such a product or physical system into the memory of a network of processing cells. More specifically, the invention relates to a method and apparatus for loading and storing a large, sparse matrix which characterizes a physical system in a form that makes it more efficiently manipulated by a plurality of interconnected processors each having its own storage and capable of operation in a highly parallel manner. The invention is also directed to a machine-implemented method and apparatus for analyzing manufactured products and/or physical phenomenon through performing matrix operations, to solve systems of linear equations and thereby enable the more accurate design of such products and the better implementation, understanding, and use of physical systems in general.

Many physical systems may be described mathematically in terms of systems of linear equations which, in turn, are solved by matrix manipulation methods. Finite element analysis is a method concerned with describing various physical systems in terms of systems of equations and developing methodologies for the solution of such systems. The term "physical system" is meant herein to refer to structure, devices, apparatus or bodies of matter (solid, liquid, gas) or simply a region of space in which a particular physical, chemical or other phenomenon is occurring. Finite element analysis had it beginnings as a method for structural analysis, but today is routinely used in the design of motors, generators, magnetic resonance imaging systems, aircraft engine ignition systems, circuit breakers and transformers, to name but a few; its techniques are used to analyze stress, temperature, molecular structure, electromagnetic fields, current, physical forces, etc. in all sorts of physical systems. It has become a standard part of the design cycle for numerous products which are not easily analyzed by other methods. The present invention has particular application in the analysis and design of such products.

Systems of linear equations required to be solved by finite element analysis techniques are very often large and complex and for that reason computationally difficult to solve. For example, a system of equations from a large, but not untypical, two-dimensional finite element analysis may have 25,000 unknowns. Where such equations are based on a finite element mesh having contributions from a majority of nodes, no choice exists but to use brute computational force to arrive at a solution. In some instances, however, such equations are both large and sparse and, thereby, afford an opportunity to pre-treat or transform the equations in a manner which makes them less computationally intensive to solve. The word "sparse" is used herein to refer to the characteristic that only a very small percentage of the elements in a matrix have non-zero values. When extreme sparcity exists in a very large system, several techniques exist which may be used to transform the system of equations into one which is more easily handled from a computational standpoint. However, in spite of such transformations, standard computational techniques may be either impractical or very inefficient depending on the size and other characteristics of the resulting matrix equations.

As one can understand from the above discussion, the field of finite element analysis has developed in large measure because of the availability of larger and more powerful computing machines for use in solving such systems. There now exist a variety of high performance, special purpose computer systems designed to perform special application calculations which are especially taxing to perform on general-purpose computers. One such system is based on the concept of a systolic architecture and provides a general methodology for mapping high-level computations into hardware structures. In a systolic system, data flows from the computer memory in a rhythmic fashion, passing through many processing elements in a chain or pipeline manner before returning to memory, thereby permitting multiple computations for each memory access and resulting in a great increase in the speed of execution of computationally intensive problems without an associated increase in input/output requirements. Some methodologies for tailoring systolic architectures to handle matrix operations are discussed in a paper by H. T. Kung and C. E. Leiserson entitled "Systolic Arrays (for VLSI)", Sparse Matrix Proc. 1978, Society for Industrial and Applied Mathematics, 1979, pp. 256-282. Another analysis of this problem and a suggested solution is addressed in the article in IEEE Transactions on Computers, Vol. C-32, No. 3, March 1983 entitled "An Efficient Parallel Algorithm for the Solution of Large Sparse Linear Matrix Equations".

The method of the invention results in storage of a matrix in a multiple processor architecture in a manner which makes it readily available for a variety of matrix operations. One such operation is back-substitution used in solving systems of linear equations which is specifically described herein, but others would suggest themselves to those skilled in the art having knowledge of the matrix storage technique described herein.

The matrix storage techniques of this invention may be implemented on a variety of parallel multiprocessor architectures, as alluded to hereinbefore. However, the use of the matrix storage method herein will be specifically described in connection with the back-substitution operation carried out on systolic array architecture as generally described in the paper by E. Arnould et al. entitled "A Systolic Array Computer" presented at the IEEE International Conference on Acoustics, Speech, and Signal Processing", Mar. 26-29, 1985, pp. 232-235. The method of the invention may be carried out on apparatus shown and described in U.S. Pat. No. 4,493,048 entitled "Systolic Array Apparatuses for Matrix Computations" issued in the name of H. T. Kung et al., the disclosure of which is hereby incorporated by reference.

OBJECTS AND SUMMARY OF THE INVENTION

A primary object of the invention therefore is to provide improved apparatus and machine implemented methods for analyzing physical systems represented by systems of linear equations.

Another object is to operate a multiprocessor in a manner which allows the more efficient analysis of manufactured products and physical systems represented by systems of linear equations.

Another object of the invention therefore is to provide a method and apparatus for loading and storing a matrix representative of such physical systems into memory associated with a plurality of processors capable of operating in a highly parallel manner.

Another object is the provision of a matrix storage technique and accompanying apparatus which are particularly useful in storing large, sparse matrices for the performance of matrix operations on highly parallel architectures.

A further object is the provision of an apparatus and method for utilizing matrices stored in the above manner for enhancing the speed and efficiency of a variety of matrix operations.

A still further object is to provide a matrix storage technique which is highly compatible with a variety of parallel, multiprocessing architectures to enhance the speed of performing matrix handling operations.

A still further object of the invention is to provide a method and apparatus for increasing the speed and efficiency of solution of systems of linear equations on parallel processors, in particular on parallel, pipeline processors.

A yet further object is the provision of a novel method for mapping large, sparse matrices which describe complex physical systems onto a known systolic array computer architecture.

A still further object is to provide a method for processing large, sparse matrices on a systolic array computer system which supports a high degree of concurrency, yet employs only simple, regular communication and control to enable efficient implementation.

A yet further object is to provide apparatus and methods for carrying out the finite element analysis method by solving systems of linear equations utilizing the back-substitution techniques on a systolic multiprocessor computer architecture. These and other objects of the invention are accomplished by the provision of a method and apparatus for loading and storing a large, sparse matrix representative of a physical structure or system into a network of processors, each processor including its own memory and interconnected for highly parallel operation. The method includes the steps of scanning said arrays of said matrix along one orthogonal axis thereof; loading non-zero elements of said matrix along said one orthogonal axis into memory associated with a plurality of said processors; and generating for storage in association with each such stored non-zero element an index for identifying the array along the other axis from which it originated. The method includes storing non-zero elements of each column of the matrix in memory locations distributed over a plurality of cells in a manner to form a plurality of transpose vectors, each transpose vector corresponding to a column of the matrix; associating an index with each stored element to identify the row of the matrix from which the matrix element originates; and multiplying each element of a transpose vector by an associated element of a common operand to generate partial results at each cell for temporary storage according to its associated index; and subsequently summing the partial results on the basis of a common index to generate the components of a final or resultant vector.

DETAILED DESCRIPTION OF THE INVENTION

Figures 1, 3:
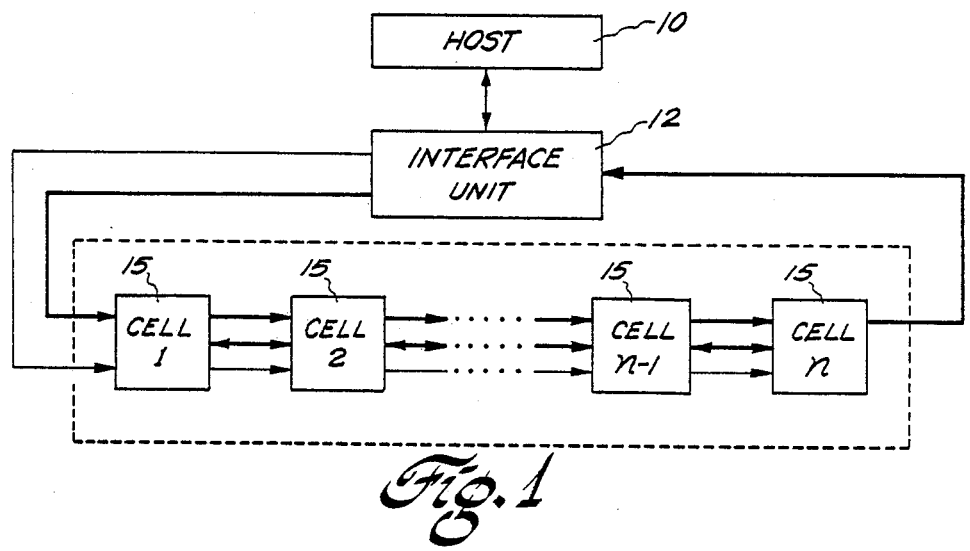
FIG. 1 illustrates a basic systolic architecture which is utilized in accordance with one method of the invention to process large, sparse matrices.
FIG. 3 illustrates a method for mapping a specific exemplary large, sparse matrix into the parallel multiprocessor array according to one implementation of the invention.

The method and apparatus of the invention will now be described in greater detail with reference to the drawings. As noted above, the novel method of the invention involves mapping, i.e., loading and storing, a matrix to be manipulated or operated on in the memories of a plurality of parallel processing cells in a form which renders the matrix more easily accessed and manipulated in carrying out a variety of standard matrix operations.

While the invention is concerned with a general methodology for mapping a matrix onto a parallel multiprocessor system, the method will be described as being carried out on the systolic array architecture referred to hereinbefore. In addition, having successfully mapped a matrix into a parallel processor of the type disclosed herein, the matrix becomes more easily manipulated for carrying out a variety of matrix operations. Thus, having mapped a matrix in accordance with the invention, various matrix operations including matrix multiplication and back-substitution may be performed on a parallel processor with an efficiency greater than previously known. Moreover, whereas a standard method of doing matrix manipulations is to use a large, powerful and expensive computer, a much smaller processor may be used to achieve this increased efficiency at a far lower cost.

As noted above, the method of the invention relates to improvements in the finite element analysis method used to analyze physical systems. In such systems, a field variable (which may be pressure, temperature, displacement, stress or some other quantity) possesses infinitely many values because it is a function of each geometric point in the body or solution area under investigation. In the first step of the method, this problem is discretized to one involving a finite (albeit large) number of unknowns by dividing the solution area into elements and by expressing the unknown field variable in terms of approximating functions within each element. Thus, the complex problem reduces to considering a series of greatly simplified problems. The approximating functions are defined in terms of values of the field variables at specified points called nodes. Then, matrix equations are written which express the properties of the individual elements.

In general, each node is characterized by a linear equation(s) which relates a resultant or forcing variable Q to a field variable X at given nodes and a "stiffness" constant A. More specifically, for a solution area under investigation having a large number of such nodes, the resultant or forcing vector variable [Q] having components $[Q_1, Q_2 \ldots Q_N]$ (which are known at boundary nodes or have a value of zero), is expressed in terms of a vector field variable [X] having components $[X_1, X_2 \ldots X_N]$ times the stiffness matrix [A] composed of constants or coefficients of the field variables at the nodes by the matrix equation $$[A][X] = [Q]$$

For example, in analyzing a linear spring systems, the resultant variable components represented by $[Q_1, Q_2 \ldots]$ may be values of force applied to the system at selected nodes; the field variable components $[X_1, X_2 \ldots]$ may be the displacement values at the nodes, and the constants may be spring stiffness values of the spring elements being studied which relate force to displacement at the nodes. The constants form a coefficient or stiffness matrix [A].

The next step in the finite element analysis method is to solve the above matrix equation. The machine techniques for manipulating a matrix equation to automatically arrive, at a solution rapidly and efficiently for systems of equations representing complex physical systems being analyzed by the finite analysis method is the principal subject of this application. A more detailed explanation of the principles of the finite element analysis method may be found in the text entitled "The Finite Element Method for Engineers" by K. H. Huebner.

In the solution of systems of linear equations generated as a result of the finite element analysis method, it is often desirable to employ the technique called back-substitution. Specifically, it is often desirable to solve the linear equation:

$$[A][X] = [Q]$$

for the unknown N-vector X, where [A] is a given square matrix of order N by N and Q is a given N-vector. The back-substitution technique is particularly efficient where the matrix [A] is in the triangular form (either upper or lower) with all diagonal elements of the matrix non-zero. Techniques for transforming a linear system of the general form given above to a system of the triangular form are well known. Such a system has the form $$A_{11}X_1 + A_{12}X_2 + \ldots A_{1,N-1}X_{N-1} + A_{1N}X_N = Q_1$$

$$A_{22}X_2 + \ldots A_{2,N-1}X_{N-1} + A_{2N}X_N = Q_2$$

$$\ldots$$

$$A_{N-1,N-1}X_{N-1} + A_{N-1,N}X_N = Q_{N-1}$$

$$A_{NN}X_N = Q_N$$

To solve this system of equations, it is first noted that the last equation can be solved for $X_N$ immediately since $A_{NN}$ (a diagonal element of the stiffness matrix) and $Q_N$ (a component of the forcing vector variable) are known. Knowing $X_N$, the second from last equation can be solved, since only one unknown exists, namely $X_{N-1}$. Specifically, $$X_{N-1} = \frac{Q_{N-1} - A_{N-1,N}X_N}{A_{N-1,N-1}}$$

With $X_N$ and $X_{N-1}$ known, the third last equation may be solved, since it contains only one true unknown, namely, $X_{N-2}$. Thus, generally for $i = N, N-1, \ldots 1$ $$X_i = \frac{\left(Q_i - \sum_{j=i+1}^{N} X_j A_{i,j}\right)}{A_{i,i}}$$

It should be noted that when $i = N$, the summation $$\sum_{j}^{N} \text{ reads } \sum_{j}^{N} = N + 1,$$

which is interpreted as the sum over no terms and gives, by convention, the value 0.

Several characteristics of the back-substitution process offer the potential for highly concurrent processing which will be implemented by the multiprocessing system herein. The first is that $X_N$, once computed, must be multiplied by each element of the nth column of the matrix. Thus, in calculating $X_{N-1}$, $X_N$ is multiplied by $A_{N-1,N}$ (the coefficient from the $N-1^{th}$ row and $N^{th}$ column). Likewise, in calculating $X_{N-2} \ldots X_1$, $X_N$ is multiplied respectively by $A_{N-2,N} \ldots A_{1,N}$ (the remaining coefficients in the Nth column. In a similar manner, the term $X_{N-1}$, once computed, is multiplied by each coefficient of the $N-1^{th}$ column. In addition, the process of obtaining $X_{N-1}, X_{N-2} \ldots$ etc., is inherently sequential since, from the above equation, $X_i$ cannot be computed until all the previous $X_{i+1}, X_{i+2}, \ldots, X_N$ have been obtained, their associated column-wise multiplications performed and the partial results accumulated.

A brief review of matrix algebra as a computational tool for solving systems of linear equations may be useful as a background to understanding the invention.

A matrix in its most usual form is a rectangular array of scalar quantities consisting of "m" rows arranged orthogonally with respect to "n" columns. The order of a matrix is defined by its number of rows times its number of columns and, accordingly, the matrix shown immediately below is referred to as an "m×n" matrix. The usual compact method of representing a matrix is shown below.

$$[A] = A_{mn} = \begin{bmatrix} A_{11} & A_{12} & \ldots & A_{1n} \\ A_{21} & A_{22} & \ldots & A_{2n} \\ \cdot & \cdot & & \\ \cdot & \cdot & & \\ \cdot & \cdot & & \\ A_{m1} & A_{m2} & \ldots & A_{mn} \end{bmatrix}$$

A row of a matrix is a horizontal line or one dimensional array of quantities, while a column is a vertical line or one dimensional array of quantities. The quantities $A_{11}, A_{12}$, etc. are said to be the elements of matrix [A]. A matrix in which $n = 1$ is a column matrix or column vector, and a matrix in which m=1 is a row matrix or row vector. Even more generally, a vector is defined as an ordered n-tuple of values. A line in a matrix is either a row or a column.

A square matrix is one in which the number of rows m equals the number of columns n. The diagonal of a square matrix consists of the elements: $A_{11}$, $A_{22}$, $A_{33}$ ... $A_{NN}$.

A triangular matrix is a matrix which contains all its non-zero elements in and either above or below its main diagonal. An upper triangular matrix has all its non-zero elements in and above its main diagonal; a lower triangular matrix has all of its non-zero elements in and below its main diagonal.

In the operation $[A] \times [X] = [Q]$ where $[A]$ is of order $m \times n$ and $[X]$ is of order $n \times p$, $[Q]$ is of order $m \times p$. Thus, where $[X]$ is a column vector, $[Q]$ will likewise be a column vector, having the same number of rows m as the number of rows in $[A]$. It should be noted that matrix multiplication is defined only where the matrix $[X]$ in the above example has the same number of rows as the number of columns in matrix $[A]$. In the above multiplication, the product $[Q]$ is obtained by multiplying the column of $[X]$ by the rows of $[A]$, so that, in general, $$Q_{ij} = \sum_{k=1}^{n} A_{ik} \times X_{kj}$$

According to the above, the multiplication of a matrix $[A]$ by a multiplication vector $[X]$ normally proceeds as noted below:

$$[Q] = \begin{bmatrix} A_{11} & A_{12} & A_{13} \\ A_{21} & A_{22} & A_{23} \\ A_{31} & A_{32} & A_{33} \end{bmatrix} \times \begin{bmatrix} X_1 \\ X_2 \\ X_3 \end{bmatrix} = \begin{bmatrix} Q_1 \\ Q_2 \\ Q_3 \end{bmatrix} =$$

$$\begin{bmatrix} A_{11} \ X_1 + A_{12} \ X_2 + A_{13} \ X_3 \\ A_{21} \ X_1 + A_{22} \ X_2 + A_{23} \ X_3 \\ A_{31} \ X_1 + A_{32} \ X_2 + A_{33} \ X_3 \end{bmatrix}$$

From the perspective of processing time required, it would be most efficient to do all the multiplications involving each specific vector element at the same time, resulting in less intermediate memory accesses. Thus, it would be more efficient from an input/output standpoint to perform the above multiplication by performing all the operations $A_{11} X_1$, $A_{21} X_1$ and $A_{31} X_1$ concurrently or in a parallel manner. However, this procedure results in a scattering of the various contributing elements of $[Q]$, which must later be gathered or recombined.

A second characteristic of the above multiplication process is that each element $Q_1$, $Q_2$, and $Q_3$ of the product vector is the result of an accumulation or summing based on the row of origin (or row index) of the matrix element. Specifically referring to the above example, it is noted that $Q_1$ is the sum of partial results derived by multiplying different elements from row 1 of the matrix by associated or corresponding elements of vector $[X]$.

Thus, a chief observation on which the invention is based is that in order to enhance concurrency of operation and for minimizing input/output requirements for the above multiplication, it should proceed temporally as:

1st operation → $X_1 * [A_{11} \ A_{21} \ A_{31}]$

2nd operation → $X_2 * [A_{12} \ A_{22} \ A_{32}]$

3rd operation → $X_3 * [A_{13} \ A_{23} \ A_{33}]$ the above to be followed by a summation of partial products based on the row index of the matrix elements involved in those partial products as follows:

$$\begin{bmatrix} Q_1 \\ Q_2 \\ Q_3 \end{bmatrix} = \begin{bmatrix} A_{11} \ X_1 + A_{12} \ X_2 + A_{13} \ X_3 \\ A_{21} \ X_1 + A_{22} \ X_2 + A_{23} \ X_3 \\ A_{31} \ X_1 + A_{32} \ X_2 + A_{33} \ X_3 \end{bmatrix}$$

The more general observation which follows from the above is that many matrix operations may be performed in a highly parallel manner by performing a first common operation across a series of different elements originating from one line of a matrix followed by a second operation based on the origin of those elements in the matrix; matrix multiplication is but one of those operations. Even more specifically, it is observed from the above that the first operation in the multiplication process is to multiply the first element of the multiplication vector by a second vector containing the elements $A_{11}$, $A_{21}$ and $A_{31}$, the elements of the matrix first column. Thus, the multiplication proceeds by multiplying each element of the multiplication vector by a transpose vector consisting of the elements of a column of the matrix. Vector element $X_2$ is likewise multiplied by the transpose of the second column of the matrix containing elements $A_{12}$, $A_{22}$ and $A_{32}$. The results of each such multiplication comprise partial results which, if accumulated based on the row of origin of the stored matrix element, will result in the resultant vector. This is seen from the prior discussion in which $Q_1$ is generated by the accumulation of partial results based on row origin i.e., $A_{11}X_1$, $A_{12}X_2$, $A_{13}X_3$. The same is true for the remaining elements of the resultant vector.

Having recognized that the above matrix multiplication, among others, may proceed concurrently as noted above, it remains to add the following observation which is applicable to large, sparse matrices encountered in finite element analysis. For such large, sparse matrices, zero or null elements do not contribute to the final result so they may be discarded or passed over in a preconditioning procedure to map the matrix into storage. While zero or null elements are always passed over or discarded in mapping the matrix to be manipulated into a parallel processor, it may be equally possible to pass over or disregard other elements which, while not exactly zero or null, are computationally insignificant. For example, elements falling within a range adjacent to zero could be ignored once the determination has been made that inclusion does not change the final results of the operations. Thus, the terms zero and null should be integrated in this sense.

Having recognized that matrix operations have the potential for being performed in a highly parallel manner, it remains to provide a technique for mapping a matrix onto a parallel processor in a manner to allow optimization of the parallel processing. Such a mapping process will now be described with regard to a parallel processing system comprising a network of processing cells, each with its own associated memory and intercoupled to communicate with each other, generally as shown in FIG. 1.

Referring to FIG. 1, there is shown a basic systolic system in which a host 10 typically receives data and outputs results to the systolic array of pipelined processing cells 15 via an interface unit 12. The host, of course, may comprise a computer, a memory, a real time device, etc. and while, as shown, in FIG. 1, both input and output is coupled to the host, input may be from one physical host while output is directed to another. The essential goal of the systolic architecture is to perform multiple computations for each input/output access of the array with the host. These multiple computations are accomplished in parallel by arranging for the cells to continue processing of a received input in a "pipeline" fashion. Thus, while cell 1 is receiving and processing a new datum, the other cells continue to operate on data or partial products of data received in a previous input access. The challenge of using a systolic array is to decompose the problem being solved into substeps which can be worked on in parallel by the various cells of the system in a rhythmic way.

Figure 2:
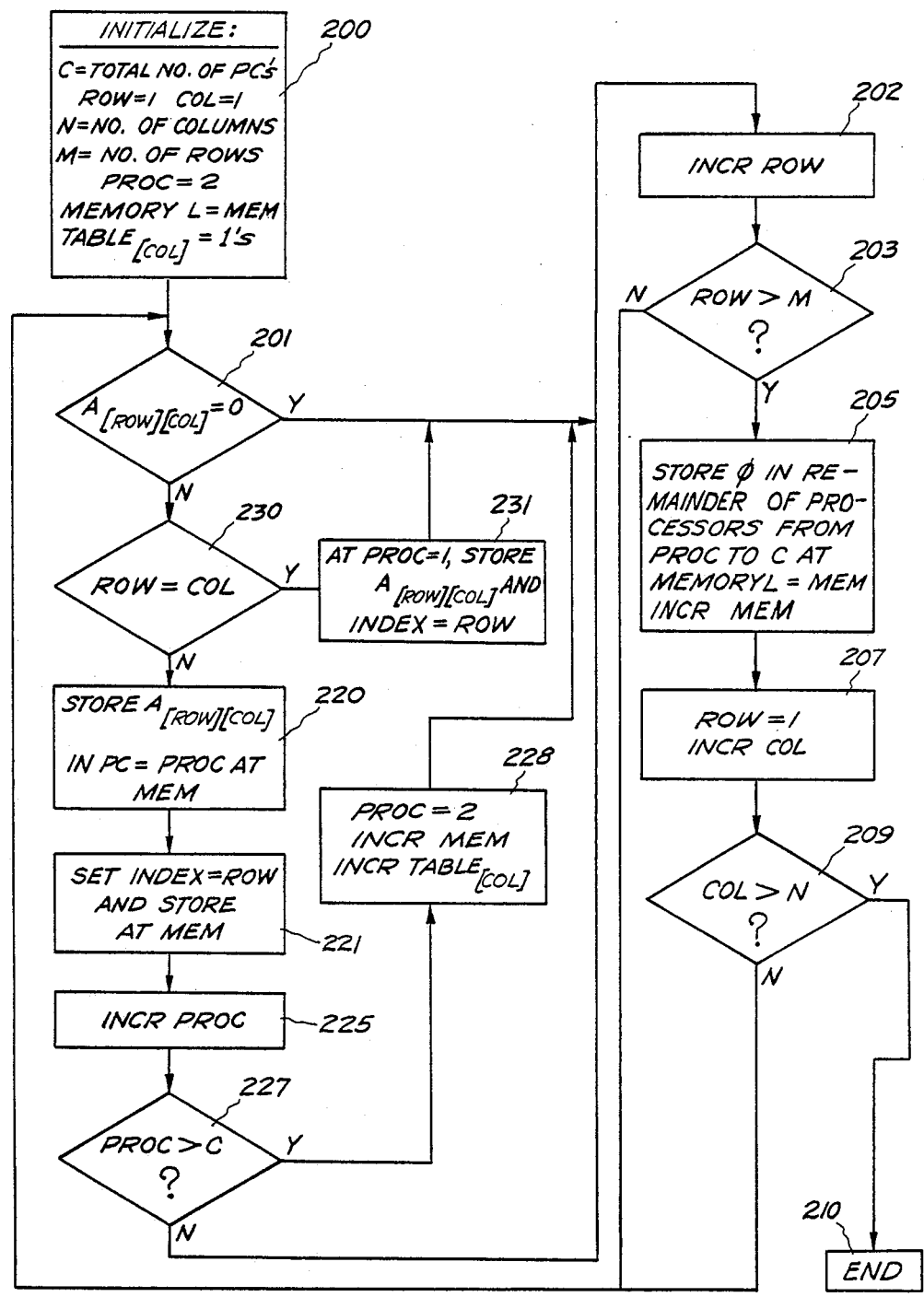
FIG. 2 is a flowchart illustrating the method for storing a large, sparse matrix into memory of a parallel multiprocessor.

The procedure for loading and storing a large, sparse matrix into a series of parallel processing cells according to the invention may be better understood by reference to the process flow diagram of FIG. 2 in conjunction with the systolic array architecture of FIG. 1. It should also be understood that the loading and storing of a matrix is accomplished under the control of the interface unit 12 of FIG. 1, which communicates during such process with the host 10 which already has the matrix stored as an array or other suitable data structure.

The object of the mapping procedure of FIG. 2 is, as alluded to hereinbefore, to store the matrix in the memory of the multiprocessor in a manner to allow a high degree of concurrency in doing matrix operations generally and the back-substitution operation in particular. This is accomplished by storing the elements of one line of the matrix in a manner which permits concurrent operation by a common operand. More specifically and as will be described hereinafter, in a back-substitution operation the elements of a matrix column are stored for successive or concurrent multiplication by a common operand which is an associated and previously calculated component of the field variable vector being solved for.

A second feature of the process is that it generates an index for association with each stored matrix element which identifies the origin (relative to another line of the matrix) of each element. Specifically, each element from a column of the matrix has associated with it an index which identifies the row of the matrix from which it came. Moreover, the stored elements from each column are formed into transpose vectors each of which may be associated with a common operand to provide regularity and concurrency of operation. Thus, several transpose vectors are formed, each being located in a given memory location in a plurality of cells, so that a common operand may operate on them. The origin and character of the common operand will depend in large measure on the particular matrix operation being carried out. In addition, null, zero and computationally insignificant elements are discarded in the storage process so that later calculations involving the stored elements may be done more rapidly. Finally, diagonal elements contained in any given transpose vector are collected for storage into a single processor cell so that they are readily available for a regular handling as part of any matrix operation in which the diagonal elements are used in a regular and repetitive manner. The back-substitution operation is one such matrix operation.

The above objectives are met by transposing the elements of the matrix columns into transpose vectors configured across the processing cells. Since null or zero elements are passed over during the storage process, the number of elements needed to accomplish the above may be quite reasonable. Many physical systems are represented by matrices on the order of $25,000 \times 25,000$ elements in which the number of non-zero elements in any given column is on the order of twenty or less. Thus, as a result of the above storage operation, each non-zero element of a column of a matrix becomes an element of a transpose vector or array stored in the same memory location of each processing cell. In addition, all diagonal members are stored, for easy access, in a single processor cell. With the non-zero elements of the columns accessible concurrently by this procedure, the common operands may be made to operate on the transpose vector in a highly parallel regular or concurrent manner, as will be explained in greater detail hereinafter.

The general procedure for mapping a matrix into a multiprocessor array to accomplish the above in accordance with the invention will now be described with reference to FIG. 2. First, starting at step 200, the constant "C" is set to equal the total number of processing cells in the parallel processor array to be utilized. The number of processing cells may vary, but should be chosen to be approximately the same as the maximum number of non-zero elements in any single column of the large, sparse matrix to be mapped. The procedure variables "Row" (row index for matrix element being processed) and "Col" (column index for matrix element being processed) are both set to equal 1, so that processing starts at the matrix element in the first row, first column and proceeds from there. The variable "Proc" (the next processing cell to be loaded with a non-zero, non-diagonal element) is set equal to 2; "Proc" may, of course, vary between 1 and C but cell 1 has been earmarked to contain only the diagonal elements of the matrix, as will be described in more detail hereinafter. The MemoryL variable (the memory location in the "Proc" being loaded) is set to "Mem", the first memory location to be filled in each of the processor cells. The host also sets or has already set from an earlier process the variables M (the number of rows in the matrix) and N (the number of columns in the matrix). Finally, at step 200 a table called Table$_{[Col]}$, which is set up in the host is initialized to all 1's in a preliminary step to correlating one column of the matrix (a specific transpose vector to be created), with a specific operand to be used subsequently in a matrix operation as will be explained in greater detail below.

Next, at step 201 the matrix element A$_{[Row][Col]}$ (which at the beginning of the procedure is matrix element, A$_{[1][1]}$) is tested to determine if it is zero. If it is zero, the element is not to be loaded into any processor cell and will be disregarded. The process moves, therefore, to steps 202 and 203 at which Row is incremented, and the value of Row is tested to determine whether it is greater than M. If it is not, the process returns to step 201 to test a new matrix element. If Row is greater than M, a complete column of the matrix has been tested and, at step 205, zeros are stored in any remaining processor cell(s) from Proc to C at memory location(s) Mem. The purpose of this step as alluded to earlier, is to permit each specific memory location in each processor to contain stored elements associated with one and only one column of the matrix. As a final portion of step 205, Mem is incremented. In this manner, the elements associated with a given column will define a transpose vector (each stored at a known memory location across a plurality of cells) and a plurality of such transpose vectors (one for each column of the matrix) will be created.

After all processing cells at a particular Mem have been filled, the process continues scanning the matrix starting at the top of the next column. Thus, at step 207, Row is reset equal to 1 and Col is incremented in preparation for testing matrix elements in a new column of the matrix. However, if in step 209, Col is greater than N (the number of columns in the matrix), then the process of loading the matrix ends (step 210). If Col is not greater than N, then the process reverts to step 201 at which the new matrix element is tested.

If the test at step 201 indicates that the matrix element being tested is not zero, the element is tested at step 230 to determine if it is a diagonal element i.e., if Row=Col. If it is a diagonal element, the element is stored at Proc=1 (processor cell 1) and an index is generated to accompany the stored diagonal element indicating the row of the matrix from which it originated. After storage of a diagonal element in cell 1, the procedure moves to steps 202 and beyond in a manner similar to that described above.

If the matrix element tested at step 230 is not a diagonal element, it is stored in the processor cell Proc at the memory location Mem, step 220. Then, an index equal to Row is generated and stored in association with the newly stored element at the same memory location Mem, step 221. Having stored a non-zero element, the process increments Proc, step 225, so that the next non-zero element will be stored in the next processor cell, and then tests Proc at step 227 to determine if it is greater than C (the total number of processor cells). If so, this indicates that all of the Mem locations in the processor cells have been filled and, at step 228, Proc is reset to 2 and Mem is incremented to a new value. In addition, the entry at Table$_{[Col]}$ in the previously created table is incremented so that during later processing, the host can correlate each column of the matrix with a given length of a transpose vector. This entry permits the host or interface unit to associate the non-zero elements corresponding to this current Col with a transpose vector covering more than one memory location (the exact number being contained in the table). If multiple memory locations are required, the host will take appropriate action later in matrix operation procedures to insure that the corresponding operands are fed into the processors the correct number of times. Then the process goes on to step 202 as previously discussed.

If step 227 determines that Proc is not greater than C, the process goes directly to step 202, since additional memory locations Mem exist in processing cells. The process continues from step 202 as previously explained.

Referring to FIG. 3, an example of the operation of the procedure of FIG. 2 for mapping a specific upper triangular matrix [A] (shown in the top portion of FIG. 3) into the exemplary memory locations of processor cells 1-4 of a multiprocessor similar to that of FIG. 1 will now be described. As can be seen, matrix [A] is of order 6×6 but is of the upper triangular form. Specifically, the matrix has been transformed into one having only zero-value elements below the diagonal, all non-zero diagonal elements, and both zero and non-zero elements above the diagonal. It should be kept in mind when reviewing this sample mapping that matrix [A] is meant to be exemplary of an upper triangular matrix of the large, sparse variety commonly encountered in characterizing physical systems by finite element methods. Such a matrix might typically be of the order of 25,000×25,000 with only about 0.1 percent of the elements in any row/column being non-zero.

Starting at step 200 of FIG. 2, the variables and constants are initialized to conform to the specifics of the matrix [A] being mapped as follows: C=4; Row=1; Col=1; N=6; M=6; MemoryL=Mem and Proc is set to 2 in order to set aside the first processor cell for holding the diagonal elements, as will be explained in greater detail hereinafter. The first element, A$_{[Row][Col]}$ is tested at step 201. Since its value is not equal to zero, it is next tested at step 230 to determine if it is a diagonal element of the matrix, specifically if Row=Col. Since element A is a diagonal element, it is stored in a location of processor cell 1 along with an index 1 designating its origin from row 1 (Step 231) The process then continues to step 202 at which Row is incremented. Then a step 203, since Row is less than M, the process returns to step 201 to examine the next element, A$_{[2][1]}$. Since there are no other non-zero elements in the first column of the matrix, the process will move repeatedly through steps 201, 202, 203 until Row is incremented to be greater than 6 at which time the procedure will go from step 203 to step 205. At step 205 zero's will be stored in processor cells 2-4 at Mem to signify that column 1 of the matrix has no non-zero elements other than the diagonal element A which has been sorted in cell 1. The loading of these zero's into cells 2-4 at Mem is shown in FIG. 3.

Having completed the scanning and loading of column 1 of matrix [A], Col is incremented to 2 and Row is reset to 1 to begin the scanning of column 2, if Col is less than or equal to N (step 209).

Column 2 is scanned in a manner identical to column 1 and, since its only non-zero element is E, and further, since the E is a diagonal element, the E is stored in cell 1 at Mem+1 and zero's are stored at Mem+1 in cells 2-4.

The process now returns to scan the third column of the matrix at step 201 where A$_{[1][3]}$ is tested. Since its value (H) is not zero, and since it is not a diagonal element (step 230), it is stored at step 220 in cell 2 at Mem+2. An index is also stored at the same locatoon in cell 2 along with the "H", indicating its origin in the first row of the matrix. Next, Proc is incremented and tested at, steps 225, 227 and since Proc is less than or equal to 4, Row is incremented and tested and a new element A$_{[3][3]}$ is processed. Since this element is zero, the process loops back again to step 201 to test A$_{[3][3]}$. Since element A$_{[3][3]}$ is non-zero and further since it is a diagonal element, it is stored in cell 1 at Mem+2, as shown in FIG. 3 in a manner identical to that which earlier stored A and E in cell 1. Since all other elements of the matrix in column 3 are zero, the cells 3 and 4 are filled with zero's via step 205 in preparation for scanning column 4 of the matrix.

The process continues, as above, iteratively storing each non-zero diagonal element of the matrix in different memory locations in cell 1, storing non-zero elements of each column in cells 2-4 while passing over zero element and, finally, filling remaining memory cells in any given memory location with zero's before beginning to scan a new column. The result is that all the non-zero elements of the first column of the matrix A are reformed into a transpose vector in the memory location identified as Mem across the processor cells. Furthermore, all diagonal element included in such a transpose vector are located in a specific processor cell, i.e. cell 1. In effect, the memory location Mem serves as an identifier for a newly created or transpose vector including all the non-zero elements of column 1 of the matrix with the diagonal element stored in cell 1. In the case of column 1 of matrix [A] of FIG. 3, only one element is contained therein and since it is a diagonal element it is stored in cell 1, all other elements being zero-valued, the remaining Mem locations are filled with zero's as shown in FIG. 3. The importance of this newly created transform vector Mem with the special handling of diagonal elements in permitting the concurrent processing of matrix elements will be explained in greater detail hereinafter.

As was indicated earlier, the number of processing cells is selected to equal the maximum number of non-zero elements in any given column of the matrix A, but it may be any number greater than 2 without departing from the spirit of the invention. However, regardless of the number of processor cells employed, it may happen that the number of non-zero elements in a particular column of the matrix exceeds the number of processor cells. To handle this situation, steps 227 and 228 as alluded to above, are included in the mapping process as illustrated in the flow chart of FIG. 2. If, for example, the first column of the matrix [A] had more non-zero elements than processor cells available, i.e., if Proc>C (step 227) before all elements of a column have been stored, then Proc is reset to 2 and Mem is incremented to Mem+1 (step 228) and the transpose vector identified as "Mem" is continued or expanded into the Mem+1 memory location. The result of this is that column 1 of the matrix is transformed into a transpose vector located in memory locations Mem and Mem+1. In such a situation, the Table$_{[Col]}$ entry at column 1 would be "2" to indicate this.

Any remaining processor cells corresponding to a given memory location which are not filled with non-zero elements after testing all the elements from a given column of the matrix are filled with zeros in accordance with step 205. For example, in Column 4 of matrix [A], there are only three non-zero elements, L, M and N, leaving Mem+3 of processor cell No. 4 to be filled with a zero to complete the transform vector at Mem+3. A similar situation is illustrated in FIG. 3 by the filling of the Mem+4 memory location of processor cell No. 4 with a zero as a result of step 205 since only three non-zero elements (Q, R, S) are present in column 5 of the matrix.

The function of that portion of the memory locations labeled Q' in FIG. 3 will be explained below with reference to the carrying out of a back-substitution operation to solve a system of linear equations involving the matrix A of FIG. 3.

Figure 4:
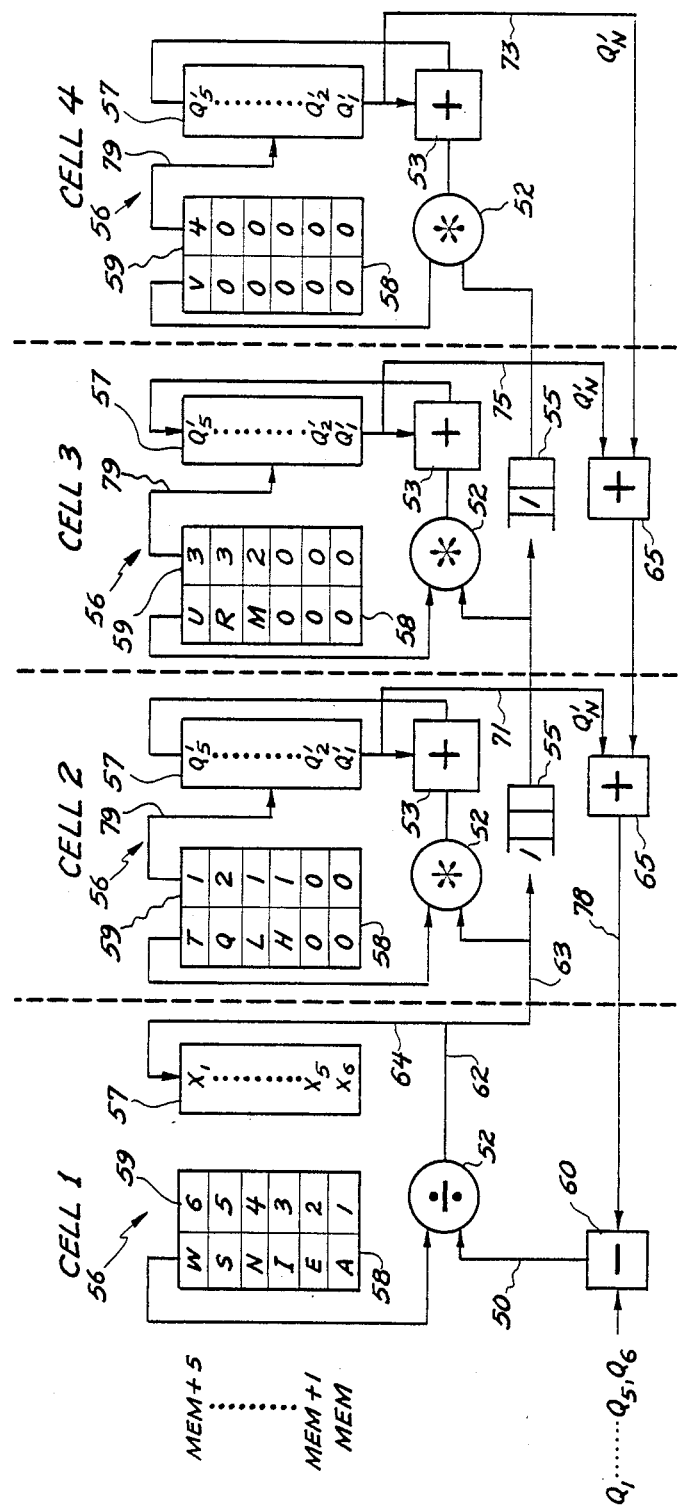
FIG. 4 illustrates a method for carrying out the back-substitution procedure to solve a triangularized system of linear equations which system is represented in part by the specific matrix stored in accordance with FIG. 3 in a parallel multiprocessor system.

Carrying out the back-substitution operation in accordance with the invention will now be described with reference to FIG. 4. To briefly review, it should be understood that prior to the initiation of the back-substitution operation, a system of equations which describes the product or physical system under investigation is generated of the form $$[A][X]=[Q]$$

As will be recalled from the discussion on pages 9–11 above, [X] is a vector representing an unknown field variable which describes an attribute of the physical system under investigation, such as displacement for a spring system. The vector [X] is composed of components $X_1 \ldots X_N$ for which the system of equations is to be solved. The vector [Q] on the other hand has components $Q_1 \ldots Q_N$ which are known and represent a resultant vector variable, such as force in a spring system being analyzed. [A] is the stiffness matrix and includes a plurality of values or constants which relate the known resultant vector variable to the unknown field vector variable at specific nodes of the finite element mesh, as discussed earlier. Thus, the object of the solution process is to calculate value of $X_1 \ldots X_N$ by the back-substitution technique given [A] and [Q] are known. In its basic form and as mentioned previously, the matrix A is typically both large and sparse. Specifically, it may be of order 25,000×25,000 elements with only a very small percentage of non-zero elements dispersed randomly throughout the matrix. The form of the matrix [A] is usually not regular in any way, i.e., it is not predictable what the particular configuration of [A] will be.

The first step in using the back-substitution process to solve the above system of equations, therefore, is to transform the matrix into the upper triangular form, i.e., a form in which all the diagonal elements of the matrix are non-zero and all other non-zero elements are located above the diagonal in the matrix; all the elements below the diagonal are zero in value. Matrix [A] in FIG. 3 shows such an upper triangular matrix which renders the above noted matrix equation susceptible to solution via the back-substitution process. The procedure for transforming a matrix from a general form to the upper triangular form, referred to as the Gaussian Elimination Method, is well-known in the art. Details of this method and of the back-substitution process generally are discussed in detail in Chapter 6 of "Introduction to Numerical Computations" by James S. Vandergraft and in section 3.2 of "Elementary Numerical Analysis" by Samuel Conte and Carl de Boor along with suitable algorithms for carrying out these procedures. Transformation of a matrix to the upper diagonal form is usually accomplished by available software for this purpose on standard computing systems such as the host system 10.

Having transformed the matrix to the upper triangular form, the first step in the solution process is to load and store the matrix [A] as described above with reference to FIGS. 2 and 3. The result of the loading and storing process for the matrix [A] of FIG. 3 is shown in FIG. 4 wherein the memory 56 of cell 1 is shown storing the diagonal elements A . . . W in memory 58 at Mem . . . Mem+5, each stored diagonal value being accompanied by an index stored in memory portion 59 designating the row origin of its associated diagonal element. A partial result storage portion 57 of cell 1 for storing calculated values $X_1 \ldots X_6$ of the vector X is also shown and will be explained in greater detail below.

In similar fashion, the memories 56 of cells 2 through 4 are shown storing the remaining non-zero values of the matrix, each stored non-zero element contained in memory portion 58 being accompanied by an index stored in portion 59 for identifying the row of the matrix from which its accompanying non-zero element originated. Each of the cells 2-4 also includes a memory portion 57 for storing partial results accumulated in accordance with the stored index accompanying the stored matrix element, as will be described in greater detail below.

It should also be noted that the elements of each column of the matrix A were reordered during the mapping process to form transpose vectors at each of the memory locations Mem to Mem+5, with the diagonal elements collected in cell 1. For example, column 4 of the matrix A is transformed into a transpose vector at memory location Mem+3 with the diagonal element N from row 4 of the matrix located in cell 1 and the remaining non-zero elements of column 4 (L, M) contained in cells 2 and 3 along with indices (1, 2) indicating the rows of the matrix from which they originated. As explained above, a zero is used to complete unfilled memory locations in each transpose vector remaining after all non-zero elements in its associated column have been stored.

Given the upper triangular matrix [A] of FIG. 3 the system of equations to be solved for [X] is as follows:

$$AX_1 + OX_2 + HX_3 + LX_4 + OX_5 + TX_6 = Q_1 \quad (1)$$
$$EX_2 + OX_3 + MX_4 + QX_5 + OX_6 = Q_2 \quad (2)$$
$$IX_3 + OX_4 + RX_5 + UX_6 = Q_3 \quad (3)$$
$$+ NX_4 + OX_5 + VX_6 = Q_4 \quad (4)$$
$$SX_5 + OX_6 = Q_5 \quad (5)$$
$$WX_6 = Q_6 \quad (6)$$

As will be recalled from the discussion on pages 10 and 11 above, to solve the above system of equations by the back-substitution process $X_6$ is first calculated by solving equation (6). Then the known value of $X_6$ is used in equation (5) to solve for $X_5$. In the specific example above, equation (5) could be solved directly H for $X_5$ since the matrix element from the 5th row, 6th column is zero, but this, of course, would not be generally true. Thus, generally before any $X_i$ can be computed all previous $X_{i+1}, X_{i+2} \ldots X_n$ must have been calculated, their associated column-wise multiplications performed, and partial results accumulated by row index. Thus, each $X_i$ must be computed in order, sequentially. It should be noted again at this point that the above system of equations is meant to be exemplary of a much larger and sparser system encountered in typical physical systems under finite element analysis and is used here for illustrative purposes only.

Since W and $Q_6$ in equation (6) are known, solving for $X_6$ is a result of a straight forward division of $Q_6$ by W (a diagonal element stored in cell 1). Once $X_6$ is obtained, solving for every successive component of [X] i.e., $X_5 \ldots X_1$ requires taking into account a partial product of $X_6$ and an element of the 6th column of the matrix (the elements of the 6th column of the matrix are stored as a transpose vector in location Mem+5 dispersed across the processor cells). Specifically, the product of the multiplication of V by $X_6$ is a partial result needed to solve for $X_4$. Likewise, $TX_6$ is a partial result needed to solve for $X_1$.

In a similar manner, once $X_5$ is obtained, it is successively multiplied by each element of the 5th column of the matrix (collectively stored in Mem+4) to produce partial results usable in calculating other components of vector [X]. Since matrix components which are zero do not contribute to the result, such multiplications may be omitted. This is done automatically by not storing zero or null elements of the matrix during the mapping process previously described.

A second observation regarding the back-substitution procedure is that the above partial results obtained by multiplying the $i^{th}$ component of X with the elements of the $i^{th}$ column of the matrix are summed based upon the row of origin of the matrix element involved in the operation. Thus, the product of the 5th component of [X] i.e, $X_5$ and the element R is summed in accordance with the index 3 (row origin of R) in solving for $X_3$. For this reason, the partial products are stored according to row index in memory queues 57 at each cell holding non-diagonal elements for eventual summing at the appropriate time according to the stored index.

The process for carrying out the solution of the above system of equations via the back-substitution technique will now be explained with reference to FIG. 4.

During the first cycle of the calculation phase, $Q_6$ is fed to subtractor 60 along with the summed partial results (zero in this instance) from adder unit 65 of cell 2. The output from subtractor 60, $Q_6$, is fed on line 50 to divider 52 of cell 1 for division by the matrix diagonal element W (from the 6th column), resulting in a determination of $X_6$ on line 62. $X_6$ is then fed via line 64 for indexed storage in the memory area 57 of cell 1.

With $X_6$ having been calculated, the process of solving equation (5) above for $X_5$ begins. To this end and in accordance with the discussion above, $X_6$ is passed via line 63 in pipeline fashion to multiplier 52 of cell 2 and after an appropriate delay to multipliers 52 of cells 3 and 4. At cells 2, 3 and 4, $X_6$ is multiplied by the elements from the 6th column of the matrix (transpose vector at Mem+5) and these partial or intermediate products are stored in the queues 57 of each cell according to the index value associated with the matrix element used in the multiplication as concurrently provided to the queues on lines 79. Specifically, the partial product $TQ_6$ is stored as $Q_1$ according to index 1 in queue 57 cell 2, and the products $UX_6$ and $VX_6$ are stored in queues 57 of cells 3 and 4 as $Q_3'$ and $Q_4'$ according to indexes 3 and 4, respectively.

Next, all of the stored partial products of the 5th row (all $Q_5'$ values from all the queues 57 of cells 2-4) are summed via lines 73, 75, and 71 and adders 65 for output on line 78.

Next, this summed partial product $Q_5'$ is subtracted from $Q_5$ in subtractor 60 to generate a difference value on line 50 for feeding to divider 52 to calculate $X_5$ by division by the next stored diagonal element.

Since none of the elements of the transpose vector corresponding to column 6 of the matrix originated in row 5 (T, U and V, originated in rows 1, 3 and 4, respectively) these partial products will not contribute to the calculation of $X_5$. Thus, when the partial products accumulated for row 5 ($Q_5'$) in the queues 57 are fed on lines 73, 75 and 71 into the adder units 65 of cells 3 and 2, a zero or null result will be obtained on line 78. Next, this zero result on line 78 is subtracted from $Q_5$ at the subtractor 60 and the result $Q_5$ is divided in divider 52 by the next diagonal element S from row 5 to generate $X_5$ on line 62 which is also stored in queue 57 of cell 1 in a similar fashion as $X_6$.

$X_5$ now available on line 63, is then fed to multipliers 52 and accumulators 53 in a manner similar to $X_6$ previously described. The partial products $QX_5$ (cell 2), $RX_5$ (cell 3), and $OX_5$ (cell 4) are accumulated as $Q_2$ and $Q_3$ and 0 respectively in the queues 57 for subsequent summing and later ultimate subtraction.

The above process continues with the result that $X_6 \ldots X_1$, are all calculated and stored in storage unit 57 of cell 1.

While the matrix calculation process specifically addressed herein is back-substitution, the forward elimination process would proceed in a similar manner and could be easily implemented in accordance with the principles of the invention by one skilled in the art. The forward elimination process requires, however, that the original system matrix be transformed into a lower triangular form, rather than the upper triangular form used in back-substitution. The forward elimination technique is also described in detail in the above noted texts.

It should also be emphasized again that while the technique of the invention was explained for the sake of brevity with respect to a small matrix and system of equations, the benefits of the invention are more obviously derived from operation on large, sparse matrices which are associated with large, sparse systems of equations representative of typical physical systems to be analyzed according to the finite element analysis method.

Thus, there has been disclosed an apparatus and method for mapping a large, sparse matrix into a multi-processor computer architecture in a way to permit more efficient and rapid computations on such a matrix. While any one of several standard parallel multiprocessors may be employed, the invention has been specifically described with reference to a known architecture of the systolic type. Also, while various operations on matrices may be performed using the disclosed matrix storage technique, a specific description of the carrying out of a back-substitution process has been used to illustrate the invention.

While the invention has been described in connection with preferred embodiments including use in a back-substitution operation performed on a systolic array computer arthitecture, the invention is not so limited to any specific parallel multiprocessor matrix operation. Consequently, modifications would be suggested to one skilled in the art having an understanding of the foregoing without departing from the spirit and scope of the invention.

What is claimed is:

1. Apparatus for loading and storing a matrix defined by a series of one dimensional arrays arranged along orthogonal axes, comprising:
   a plurality of processing cells, said cells being intercoupled to pass data therebetween;
   a memory for each said processing cell;
   means for scanning each element of said matrix along one orthogonal axis thereof;
   means for loading non-zero elements of said matrix along said one orthogonal axis into the respective memories of a plurality of said cells, said means for loading including means for loading all of the non-zero diagonal elements of said matrix into the memory of a designated one of said cells; and
   means for generating an index, said index being stored in association with each such stored non-zero element for identifying the array along said other axis from which said non-zero element originated.

2. The combination of claim 1 wherein said means for loading comprises means for loading consecutive non-zero, non-diagonal elements into consecutive processing cells.

3. The combination recited in claim 2 further including
   means for concurrently operating on said stored elements with a plurality of previously determined to generate intermediate results; and
   means for storing said intermediate results at each cell according to said index.

4. The combination recited in claim 3 further including:
   means for processing said intermediate results from a plurality of processing cells based on said index.

5. The combination recited in claim 4 wherein said means for operating on said stored elements comprises means for multiplying each stored non-diagonal element originating from a given column of the matrix by a common element of a second matrix.

6. Apparatus for loading and storing a matrix on a parallel processor comprising a plurality of processing cells, each cell having a memory, comprising:
   means for storing elements of a matrix in the memories of a plurality of said cells, said means for storing including means for storing all non-zero diagonal elements of said matrix in the memory of one of said cells; and
   means for generating and storing in association with each stored element an index for identifying a one dimensional array of said matrix from which said stored element originates.

7. The combination recited in claim 6 further including:
   means for performing a matrix operation on said stored elements to generate intermediate results;
   means for accumulating said intermediate results at each cell according to said index; and
   means for processing said intermediate results from a plurality of processing cells based on said index.

8. The combination recited in claim 7 wherein said matrix includes a plurality of rows and columns and wherein said means for storing further comprises means for scanning each column of said matrix, disregarding zero elements, and storing non-zero elements in the respective memories of a plurality of said cells, the stored elements of each column forming different transpose vectors.

9. The combination recited in claim 8 wherein said index identifies the row of said matrix from which each stored element originates.

10. The combination recited in claim 9 wherein said means for performing a matrix operation comprises means for multiplying each stored non-diagonal element of said transpose vector by a common operand.

11. The combination recited in claim 10 wherein said multiplying means further includes means for successively multiplying different elements of a given transpose vector by the same element of a second vector at a plurality of processing cells.

12. The combination recited in claim 11 further including means for accumulating the partial results generated at each processor cell according to said index.

13. The combination recited in claim 12 further including means for accumulating the partial results from multiplication operations at each cell according to said index.

14. In a process for analyzing a physical system which can be defined by certain physical variables capable of being expressed in terms of a plurality of linear equations solvable by matrix manipulation methods, a machine implemented method for loading and storing a matrix of elements which relate said variables to each other onto a parallel processor which includes a plurality of processing cells, each cell having a memory, the matrix being comprised of a series of one dimensional arrays of said elements along orthogonal axes, the method comprising the steps of:

scanning said arrays of said matrix along one orthogonal axis thereof;

loading non-zero elements of said matrix along said one orthogonal axis into the respective memories of a plurality of said cells, all of said non-zero diagonal elements of said matrix being loaded into a designated one of said cells; and generating for storage in association with each such stored non-zero element an index for identifying the array along said other axis from which said non-zero element originated.

15. The method of claim 14 wherein said loading comprises the steps of loading consecutive non-zero non-diagonal elements into consecutive processing cells.

16. The method of claim 14 including the further step of successively operating on said stored elements in each cell with a plurality of previously determined operands to generate intermediate results in each cell; and storing said intermediate results in said cell according to said index.

17. The method of claim 16 further including the step of:

processing said intermediate results from a plurality of processig cells according to said index.

18. The method of claim 17 wherein said step of successively operating on said stored elements comprises successively multiplying each stored non-diagonal element originating from the same column of sid matrix by the same element of a second matrix.

19. In a process for analyzing a physical system which can be defined by certain physical variables capable of being expressed in terms of a plurality of linear equations solvable by matrix manipulation methods, a machine implemented method for loading and storing a matrix of elements which relate said variables to each other onto a parallel processor which includes a plurality of processing cells, each cell having a memory, the matrix being comprised of a series of one dimensional arrays of said elements along orthogonal axes, the method comprising the steps of:

storing elements of said matrix in the memories of a plurality of said cells, diagonal elements of said matrix being stored in a designated one of said cells; and generating for storage in association with each stored element an index for identifying the array along one axis of said matrix from which said stored element originates.

20. The method of claim 19 wherein said matrix includes a plurality of rows and columns and said storing includes the steps of scanning each element of each column of said matrix, disregarding zero elements, and storing scanned non-zero elements in memory locations associated with a plurality of said cells, the stored elements of each column forming different transpose vectors.

21. The method of claim 20 wherein said index identifies the row of said matrix from which each said non-zero element originates.

22. The method of claim 21 further including the steps of:

performing a matrix operation on said stored elements to generate intermediate results;

storing said intermediate results according to said index; and processing said intermediate results from a plurality of processing cells according to said index.

23. The method of claim 22 wherein the step of performing a matrix operation comprises multiplying each stored non-diagonal element of a given transpose vector by corresponding element of a second vector.

24. The method of claim 23 wherein said multiplying takes place by moving each element of said second vector into each processor cell to be multiplied by a different element from the corresponding one of said transpose vectors.

25. The method of claim 23 wherein the results of said multiplying steps are accumulated according to said index at each processor cell.

26. The method of claim 25 including the further step of accumulating the results from said cells according to said index.

27. In a process for analyzing a physical system which can be defined by certain physical variables capable of being expressed in terms of a plurality of linear equations solvable by matrix manipulation methods, a machine implemented method for loading and storing a matrix of elements which relate said variables to each other onto a parallel processor which includes a plurality of processing cells, each cell having a memory, the matrix being comprised of a series of one dimensional arrays of said elements along orthogonal axes, the method comprising the steps of:

transposing elements of each array along one axis of said matrix into a transpose vector, one transpose vector being transposed from each array along said one axis, each said transpose vector comprising values corresponding to said elements stored in a plurality of said cells, diagonal elements of said matrix being stored in a designated one of said cells; and generating an index for storage in association with each stored element of said vectors, said index being operative to identify the array along said second axis from which said stored element originates.

28. The method of claim 27 wherein said matrix is sparse and only computationally significant elements thereof are transposed into said transpose vectors.

29. The method of claim 28 wherein only non-zero elements are transposed.

30. The method of claim 29 further including the step of:

processing said intermediate results from a plurality of processing cells as a function of said index.

31. The method of claim 27 wherein said step of transposing comprises scanning consecutive elements of said arrays.

32. The method of claim 27 including the further steps of concurrently operating on said stored non-diagonal elements with a plurality of previously determined operands to generate intermediate results in each cell; and storing said intermediate results in said cell based on said index.

* * * * *